US008896742B2

(12) United States Patent
Fukushima

(10) Patent No.: US 8,896,742 B2
(45) Date of Patent: Nov. 25, 2014

(54) IMAGE PICKUP APPARATUS, AND CONTROL METHOD AND PROGRAM THEREOF

(75) Inventor: Yuki Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 13/419,736

(22) Filed: Mar. 14, 2012

(65) Prior Publication Data

US 2012/0249848 A1 Oct. 4, 2012

(30) Foreign Application Priority Data

Apr. 1, 2011 (JP) .................................. 2011-082165

(51) Int. Cl.
| | |
|---|---|
| H04N 5/235 | (2006.01) |
| H04N 5/232 | (2006.01) |
| H04N 5/238 | (2006.01) |
| H04N 5/222 | (2006.01) |

(52) U.S. Cl.
CPC ....... H04N 5/23212 (2013.01); H04N 5/23245 (2013.01); H04N 5/235 (2013.01)
USPC ................... 348/333.12; 348/229.1; 348/349; 348/364

(58) Field of Classification Search
CPC ..... H04N 5/232; H04N 5/235; H04N 1/3875; G03B 13/36
USPC ......... 348/222.1, 229.1, 333.01, 333.12, 345, 348/350, 353–356, 362–366
See application file for complete search history.

(56) References Cited

U.S. PATENT DOCUMENTS

| | | | | |
|---|---|---|---|---|
| 4,978,983 | A | * | 12/1990 | St.Ålfors .......................... 396/89 |
| 7,742,637 | B2 | * | 6/2010 | Xiao et al. ..................... 382/167 |

(Continued)

FOREIGN PATENT DOCUMENTS

| | | |
|---|---|---|
| CN | 85109454 A | 7/1986 |
| CN | 101778214 A | 7/2010 |
| JP | 2005-260733 | 9/2005 |

OTHER PUBLICATIONS

Sep. 25, 2014 Chinese Office Action, a copy of which is enclosed with an English Translation, that issued in Chinese Patent Application No. 201210093331.5.

Primary Examiner — Sinh Tran
Assistant Examiner — Mark Monk
(74) Attorney, Agent, or Firm — Cowan, Liebowitz & Latman, P.C.

(57) ABSTRACT

An image pickup apparatus is arranged to perform live view to display enlarged image by deciding a Tv value, an Av value, and an ISO value based on a program diagram for deciding an exposure amount from brightness of an object, when a change instruction of an AF adjustment value used for a live view is provided, while when an operation to start the live view is provided and the change instruction of the AF adjustment value used for the live view is not provided, the apparatus performs live view by deciding the Tv value, Av value, and ISO value based on the program diagram if a photographing mode is not a manual mode, but performs the live view by using the Tv value, Av value, and ISO value set by the user, if the photographing mode is the manual mode.

8 Claims, 8 Drawing Sheets

(56) References Cited

U.S. PATENT DOCUMENTS

| | | | |
|---|---|---|---|
| 7,873,222 B2 * | 1/2011 | Chan et al. | 382/218 |
| 2005/0219393 A1 * | 10/2005 | Sugimoto | 348/333.01 |
| 2008/0278618 A1 * | 11/2008 | Matsumoto et al. | 348/345 |
| 2010/0066897 A1 * | 3/2010 | Miyanari | 348/362 |
| 2010/0134652 A1 | 6/2010 | Takane | |
| 2010/0284678 A1 * | 11/2010 | Kubota | 396/213 |
| 2010/0284679 A1 * | 11/2010 | Mizukami et al. | 396/257 |
| 2011/0013894 A1 * | 1/2011 | Takaiwa | 396/48 |

* cited by examiner

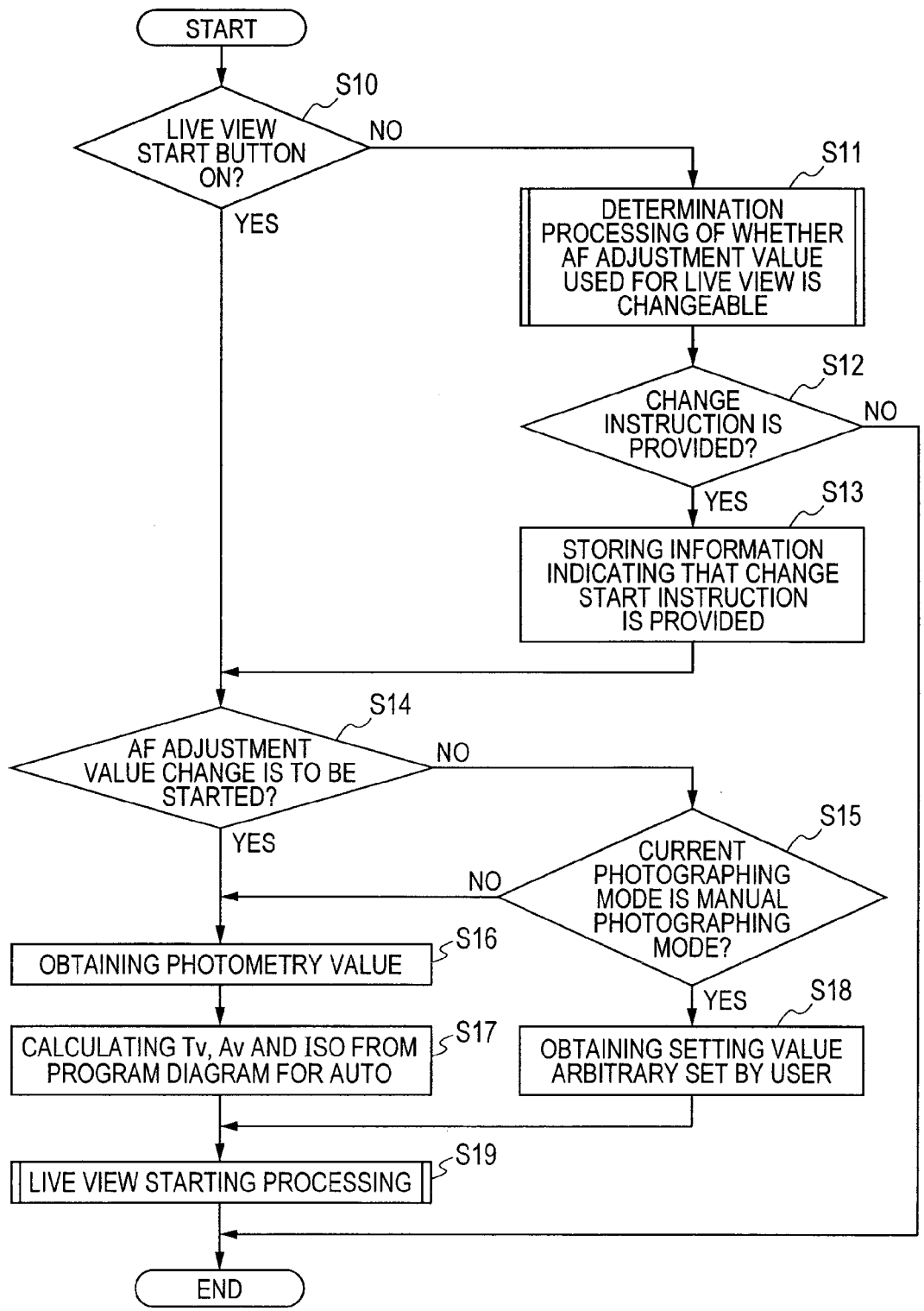

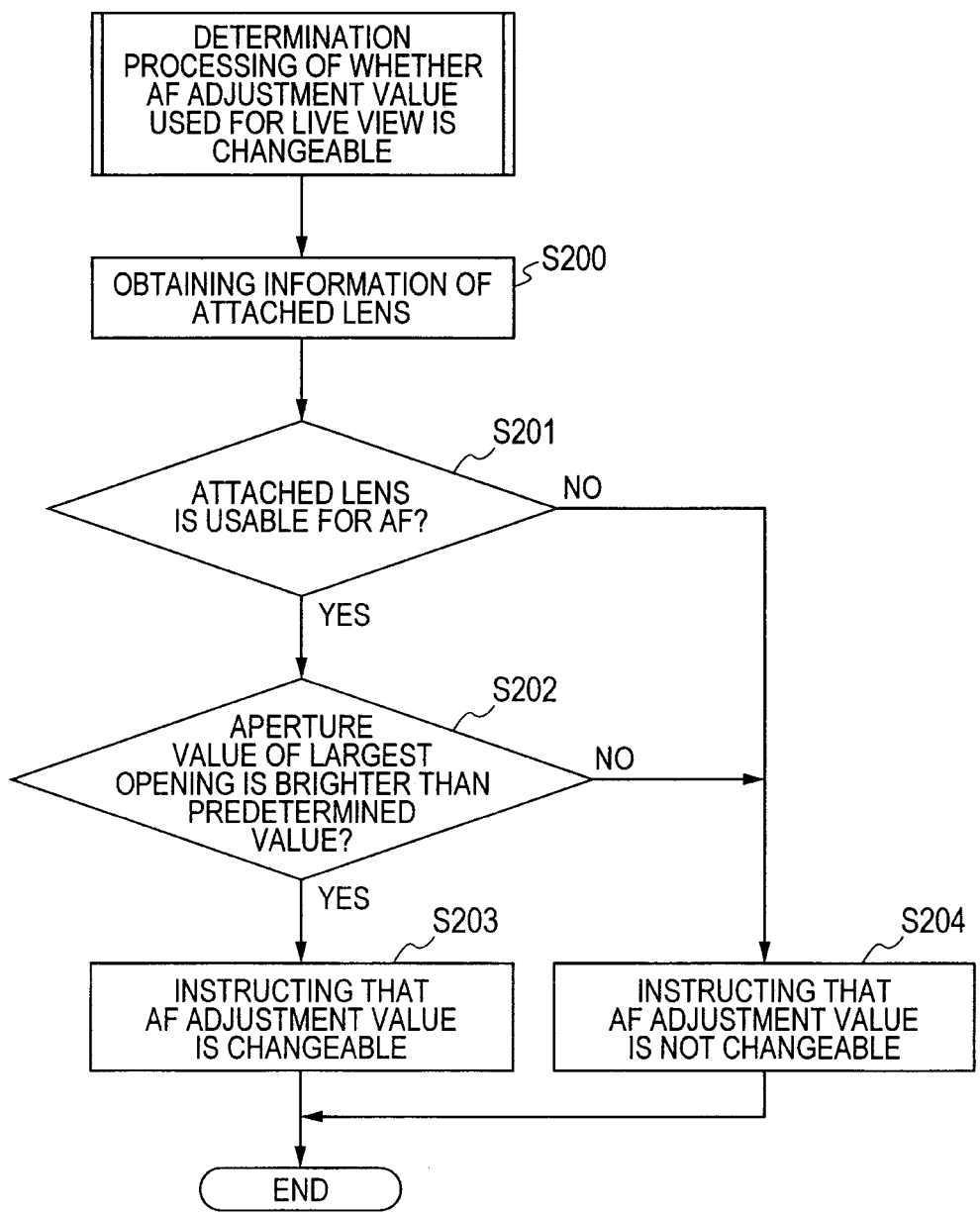

IMAGE PICKUP APPARATUS, AND CONTROL METHOD AND PROGRAM THEREOF

BACKGROUND OF THE INVENTION

1. Field of the Invention

The present invention relates to an image pickup apparatus having a live view function of displaying an object image on a display unit and to a control method and a program for the image pickup apparatus.

2. Description of the Related Art

In the related art, since there are various setting values necessary for photographing in an electronic still camera, it is necessary to change those setting values in accordance with a photographing environment and an attached lens. In case of changing the setting values, it is desirable that while changing the setting values, the user is allowed to easily understand an effect which is obtained by such a change. Particularly, in case of performing AF calibration setting, that is, performing a focusing adjustment value change which corrects a fine defocus amount during auto focus processing, it will be difficult to attain the change of the focusing adjustment value, unless the change process is presented viewably. Therefore, there exists such an apparatus that a live view is started simultaneously with the start of the setting in order to allow the user to easily understand the effect which is obtained by the change.

When the live view is started simultaneously with the start of the setting, since a through image of the live view is displayed in accordance with a Tv value, an Av value, and an ISO value which were set by the user, there is a case where the started live view is not optimum depending on an external environment. In such a case, first, the user himself has to set the Tv value, Av value, and ISO value so that the optimum live view is performed. It is, therefore, troublesome and the Tv value, Av value, and ISO value which have been set at that point of time have to be changed.

Patent Literature 1 (the Official Gazette of Japanese Patent Application Laid-Open No. 2005-260733) discloses the following construction. That is, in a non-depression state in which a release button is not operated, an electronic shutter speed, an aperture value, and a photographing sensitivity which are determined for brightness of an object are set on the basis of a first program diagram which uses an electronic shutter speed adapted to prevent the occurrence of a flicker, in a low brightness range, and in a state in which the release button remains being half-depressed, the aperture value for still image photographing which is determined in response to the half-depressing operation of the release button is set, and the aperture value for still image photographing is applied to an aperture-priority second program diagram to set the electronic shutter speed and the photographing sensitivity which are determined for brightness of the object. However, in such a case, on the contrary, an image to which the Tv value (electronic shutter speed), Av value (aperture value), and ISO value (photographing sensitivity) which were set by the user are reflected is not displayed so long as the release button is not half-depressed. Therefore, a problem occurs in a normal photographing and the troublesomeness is not solved yet.

SUMMARY OF THE INVENTION

The invention is made in consideration of the problems as mentioned above and it is an aspect of the invention to enable setting values to be easily and viewably changed.

According to the invention, there is provided an image pickup apparatus having a change mode in which an auto focusing adjustment value is changeable with a live view being displayed on a display unit, comprising: a display control unit configured to perform the live view for displaying an image of an object on the display unit; a photometry unit configured to measure brightness of the object; and a control unit configured to select a program diagram corresponding to a photographing mode selected by the user from a plurality of program diagrams each for deciding an electronic shutter speed, an aperture value, and an ISO value in correspondence to the brightness of the object measured by the photometry unit, wherein in a case where the photographing mode is shifted to the change mode, the control unit allows the live view to be executed based on a predetermined program diagram irrespective of the photographing mode selected by the user.

Further features of the present invention will become apparent from the following description of exemplary embodiments with reference to the attached drawings.

BRIEF DESCRIPTION OF THE DRAWINGS

FIG. 3 is a flowchart illustrating the processing operation of the electronic still camera according to the embodiment of the invention.

FIGS. 6A and 6B are diagrams each illustrating an example of a live view display, in which FIG. 6A is a diagram illustrating the live view display in normal displaying and FIG. 6B is a diagram illustrating the live view display in enlargement displaying.

FIG. 7 is a flowchart illustrating a determination processing for discriminating whether or not an AF adjustment value using the live view in the flowchart of FIG. 3 is changeable.

FIGS. 8A and 8B are diagrams each illustrating an example of a GUI screen, in which FIG. 8A is a diagram illustrating the GUI screen by which the change of the AF adjustment value using the live view and the change of the AF adjustment value which does not use the live view can be selected and FIG. 8B is a diagram illustrating the GUI screen by which the change of the AF adjustment value cannot be selected.

DESCRIPTION OF THE EMBODIMENTS

Exemplary embodiments of the present invention will be described hereinbelow with reference to the drawings.

Figure 1:
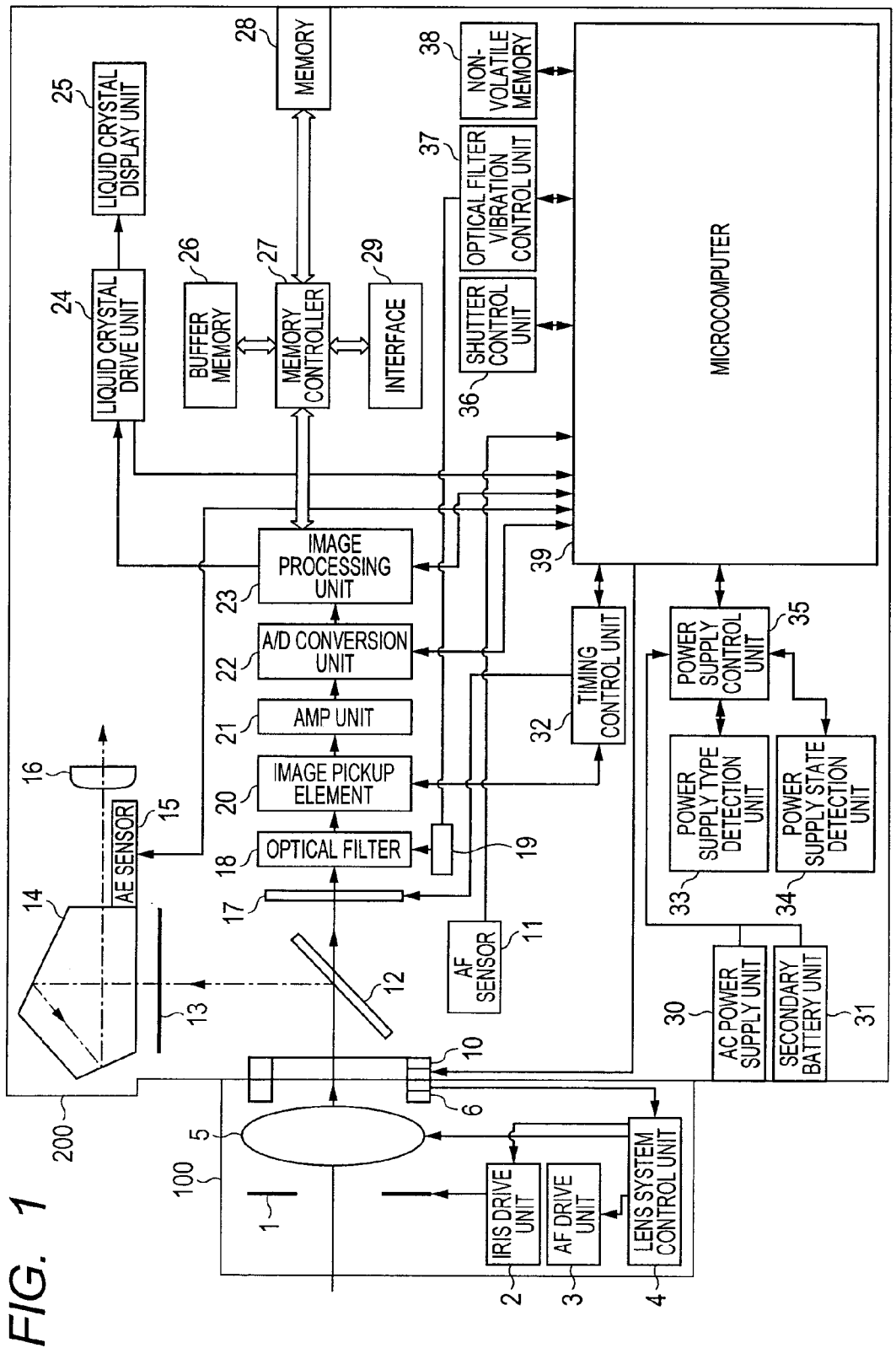
FIG. 1 is a block diagram illustrating a constructional example of an electronic still camera according to an embodiment of the invention.

A construction of an electronic still camera having a live view function according to the embodiment of the invention will be described with reference to FIGS. 1, 2A, and 2B. FIG. 1 is a block diagram illustrating a constructional example of the electronic still camera according to the embodiment of the invention. A camera main body 200 and a lens unit 100 are illustrated. Although a lens 5 of the lens unit 100 is ordinarily constructed by a plurality of lenses, it is simply illustrated here as only a single lens.

A communicating terminal 6 is used for the lens unit 100 to communicate with the camera main body 200 side. A communicating terminal 10 is used for the camera main body 200 to communicate with the lens unit 100 side. The lens unit 100 communicates with a microcomputer 39 of the camera main body 200 through the communicating terminals 6 and 10. By such communication, an iris 1 is controlled by an internal lens system control unit 4 through an iris drive unit 2. A position of the lens 5 is deviated through an AF drive unit 3, thereby setting a focal point.

In the camera main body 200, an AF sensor 11 outputs a defocus amount to the microcomputer 39. The microcomputer 39 controls the lens unit 100 on the basis of the defocus amount. An AE sensor 15 measures brightness of an object through the lens unit 100. A quick return mirror 12 is drawn up and down by an actuator (not shown) by an instruction from the microcomputer 39 at the time of exposure. A focusing screen 13, a penta prism 14, and a finder 16 are provided. By observing the focusing screen 13 through the penta prism 14 and finder 16, the photographer can confirm a focal point and framing of the optical image of the object obtained through the lens unit 100.

A focal plane shutter 17 can control an exposure time of an image pickup element 20 under control by the microcomputer 39 to attain any exposure time. An optical filer 18 is generally constructed by a low-pass filter or the like, cuts a high frequency component of light which enters from the focal plane shutter 17, and guides the object image light to the image pickup element 20. A piezoelectric element 19 is connected to the optical filer 18. As an image pickup element 20, an image pickup element such as CCD, CMOS, or the like is generally used. The image pickup element outputs the object image, as an electric signal, formed on the image pickup element 20 through the lens unit 100 by photoelectrically converting the object image.

An amp unit 21 amplifies the electric signal output from the image pickup element 20 by a gain according to the set photographing sensitivity. An AD conversion unit 22 converts an analog signal converted into the electric signal by the image pickup element 20 into a digital signal. An image processing unit 23, a liquid crystal drive unit 24, and a liquid crystal display unit 25 are provided. The image processing unit 23 executes a filter processing, a color conversion processing, and a gamma/knee processing to image data converted into the digital signal by the AD conversion unit 22 and outputs an obtained signal to a memory controller 27. The image processing unit 23 also includes a DA conversion unit. By the image processing unit 23, the image data converted into the digital signal by the AD conversion unit 22 or image data which is input by the memory controller 27 can be converted into an analog signal and output to the liquid crystal display unit 25 by the liquid crystal drive unit 24. The image processing and display processing which are executed by the image processing unit 23 are switched by the microcomputer 39. The microcomputer 39 also performs a white balance adjustment on the basis of color balance information of the photographed image.

A buffer memory 26, the memory controller 27, a memory 28, and an external interface 29 are provided. The memory controller 27 allows the non-processed image data which is input from the image processing unit 23 to be stored into the buffer memory 26. The memory controller 27 allows the image-processed image data to be stored into the memory 28 or, contrarily, allows the image data to be extracted from the buffer memory 26 or the memory 28 and to be output to the image processing unit 23. The memory controller 27 can also allow image data which is sent through the external interface 29 such as USB (Universal Serial Bus), IEEE (Institute of Electrical and Electronics Engineers), HDMI (High-Definition Multimedia Interface), or the like to be stored into the memory 28 or, contrarily, can also allow the image data stored in the memory 28 to be output to an outside through the external interface 29. The memory 28 may be arranged in a detachable manner and, for example, a Compact Flash (registered trademark) can be used.

The micro computer 39 controls drive timing of the image pickup element 20 by a timing control unit 32. An AC power supply unit 30, a secondary battery unit 31, a power supply type detection unit 33, a power supply state detection unit 34, and a power supply control unit 35 are provided. An electric power is supplied from the AC power supply unit 30 or the secondary battery unit 31. The power supply control unit 35 turns on/off a power supply in response to an instruction from the microcomputer 39. The power supply control unit 35 also notifies the microcomputer 39 of information showing a current state of the power supply detected by the power supply state detection unit 34 and information of a type of the current power supply detected by the power supply type detection unit 33.

The micro computer 39 controls the focal plane shutter 17 by a shutter control unit 36. The microcomputer 39 allows the piezoelectric element 19 connected to the optical filer 18 to be vibrated by an optical filer vibration control unit 37. The piezoelectric element is vibrated in response to an instruction from the microcomputer 39 in accordance with predetermined values of respective amplitude, period time, and axis orientation of the vibration. A non-volatile memory (EEPROM) 38 can store setting values such as shutter speed, aperture value, photographing sensitivity, and the like which were arbitrarily set by the user and data even in a state in which the power supply of the camera is OFF.

Figure 2A:
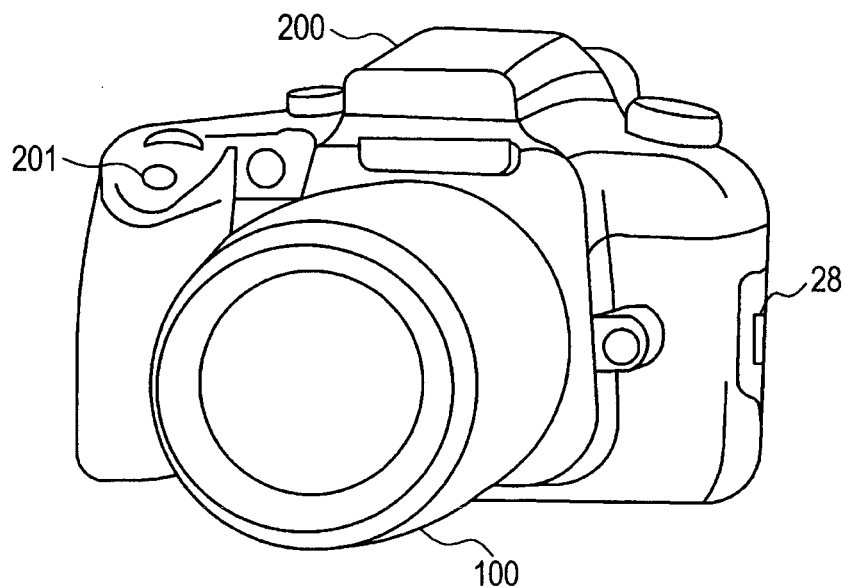
FIGS. 2A and 2B are external views of the electronic still camera according to the embodiment of the invention.
Figure 2B:
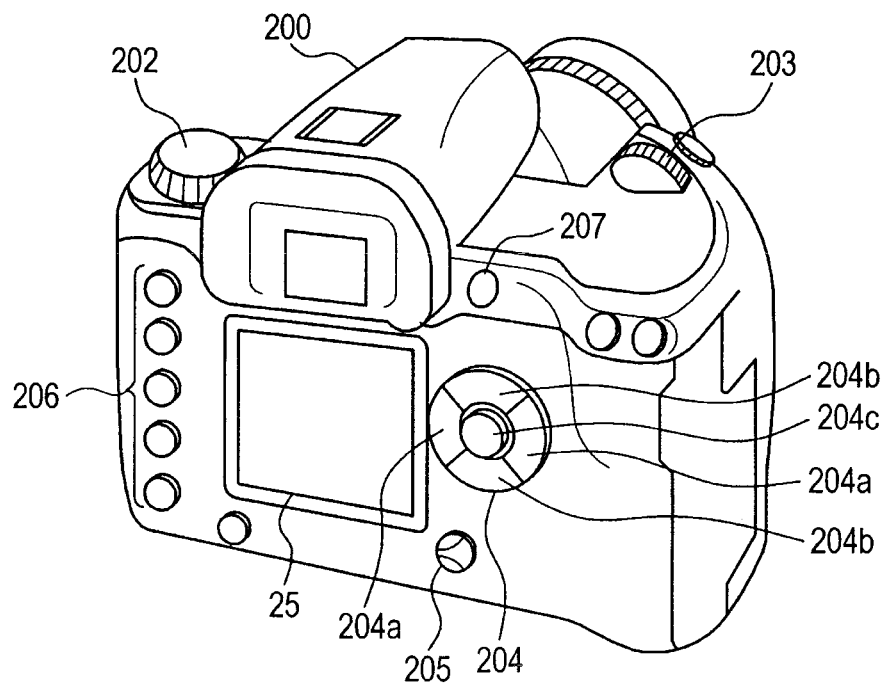

FIGS. 2A and 2B are external views of the electronic still camera according to the embodiment of the invention and illustrate a state in which the lens unit 100 has been attached to the camera main body 200. Component elements which are common to those in FIG. 1 are designated by the same reference numerals. A measurement of the brightness of the object and an in-focusing operation are executed when a release button 201 is half-depressed. When the release button 201 is full-depressed, a shutter is released and an image is photographed.

A mode dial 202 to set a mode of a camera is provided. By rotating the mode dial 202, the mode such as sports mode, landscape mode, or the like can be set. By rotating an electronic dial 203, setting values such as shutter speed, aperture value, and the like can be set.

A four-way operative key and selecting button 204 is provided. When a selection of setting contents, a thumbnail image, and the like displayed on the liquid crystal display unit 25 is performed, a selecting range is moved in the lateral direction by depressing a button 204a and the selecting range is moved in the vertical direction by depressing a button 204b. The selected contents can be set or a moving image recording can be started by depressing a button 204c at the selected position.

By rotating a power supply switch 205, the power supply can be turned on and off. A group of switches 206 to make various kinds of settings are provided. A switch group 206 includes: a reproduction instruction button for allowing images stored in recording medium provided within and outside the camera to be displayed on the liquid crystal display unit 25; a setting screen display instruction button for allowing various kinds of setting display screens to be displayed on the liquid crystal display unit 25; and the like. By depressing each of those switches, the user can allow a display screen for making various kinds of settings to be displayed or can allow the photographed images to be displayed and confirm them, or the like. By depressing a live view operation start button 207, the camera can be shifted into a live view state.

A description will be made hereinbelow with respect to a processing which is executed by the electronic still camera according to the embodiment when the live view operation start button 207 is depressed and a processing which is executed when there is a change instruction of an auto focusing adjustment value (hereinbelow, referred to as an AF adjustment value). FIG. 3 is a flowchart illustrating a flow for the processing which is executed by the microcomputer 39.

First, in step S10, the microcomputer 39 discriminates whether or not the live view operation start button 207 is depressed. If it is depressed, the processing routine advances to step S14. If it is not depressed, step S11 follows.

In step S11, the microcomputer 39 discriminates whether or not the AF adjustment value used for the live view is changeable, that is, whether or not the photographing mode can be shifted to the change mode in which the AF adjustment value with the live view being displayed is changeable. The processing in step S11 will be described in detail hereinafter. In step S12, the microcomputer 39 discriminates whether or not an instruction to change the AF adjustment value used for the live view is provided. If the change instruction is provided, step S13 follows. If the change instruction is not provided, the processing routine is finished. In step S13, the microcomputer 39 stores information indicating that the instruction to change the AF adjustment value used for the live view is provided into the non-volatile memory 38. After that, step S14 follows.

In step S14, on the basis of the information stored in step S13, the microcomputer 39 discriminates whether or not the change of the AF adjustment value is started. If the change of the AF adjustment value is started, step S16 follows. If the change of the AF adjustment value is not started, step S15 follows.

In step S15, the microcomputer 39 discriminates whether or not the current photographing mode is a manual mode. If it is the manual mode, step S18 follows. If it is not the manual mode, step S16 follows.

In step S16, the microcomputer 39 obtains the brightness of the object by the AE sensor 15. In step S17, the microcomputer 39 sets the Tv value, Av value, and ISO value according to a program diagram correspondingly to the brightness of the object, obtained in step S16.

Figure 4:
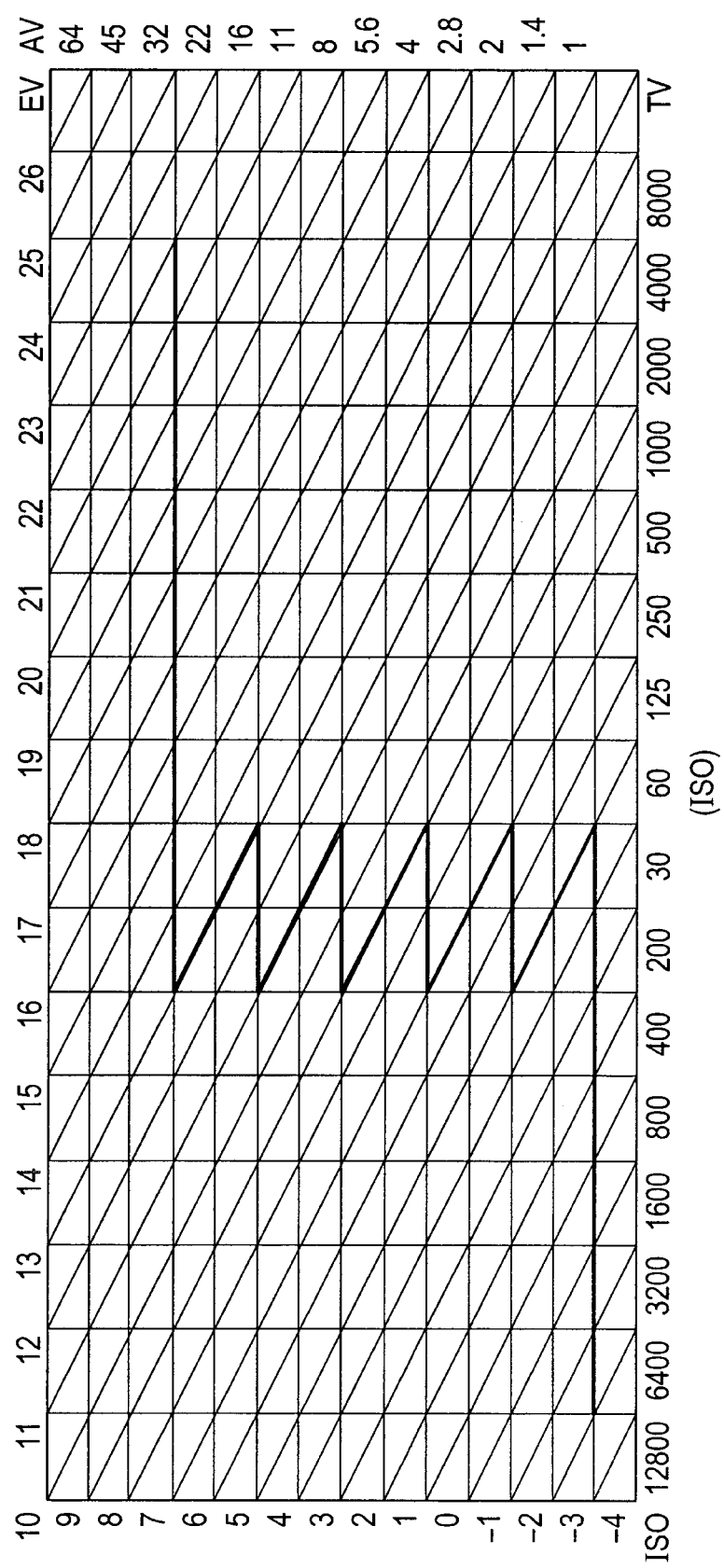
FIG. 4 is a diagram illustrating an example of a program diagram for deciding an exposure amount from brightness of an object.

The program diagram to decide an exposure amount from the brightness of the object will now be described with reference to FIG. 4. FIG. 4 is the program diagram for obtaining such Tv value, Av value, and ISO value that attain a proper exposure amount irrespective of the setting values set by the user. A frame rate adapted to display a live view image is set to 30 fps. Therefore, in a case of a low shutter speed having the Tv value equal to or greater than ⅟30 seconds, it is constructed so that the proper exposure amount can be obtained by increasing the ISO value. If such a program diagram is selected, the Tv value, Av value, and ISO value are set from the brightness of the object and the program diagram without using the setting values which are arbitrarily set by the user. For example, assuming that the Av value set by the user is equal to AV5.6 and the brightness of the object is equal to EV5, by setting the Tv value to ⅟30 (second), the Av value to 2.0, and the ISO value to 400, the image of the proper exposure amount can be obtained.

In step S18, the micro computer 39 reads the Tv value, Av value, and ISO value set by the user from the non-volatile memory 38.

In step S19, the microcomputer 39 executes a starting processing of the live view on the basis of the Tv value, Av value, and ISO value obtained in step S17 or S18.

As mentioned above, if the instruction to change the AF adjustment value used for the live view is provided, the Tv value, Av value, and ISO value are decided based on the program diagram for deciding the exposure amount from the brightness of the object, thereby executing the live view. In the case where the starting operation of the live view is executed and the instruction to change the AF adjustment value used for the live view is not provided, even when the photographing mode is not the manual mode, the Tv value, Av value, and ISO value are decided based on the program diagram for deciding the exposure amount from the brightness of the object, thereby executing the live view. On the other hand, in the case where the starting operation of the live view is executed and the instruction to change the AF adjustment value used for the live view is not provided, when the photographing mode is the manual mode, the live view is executed by using the Tv value, Av value, and ISO value set by the user.

Figure 5:
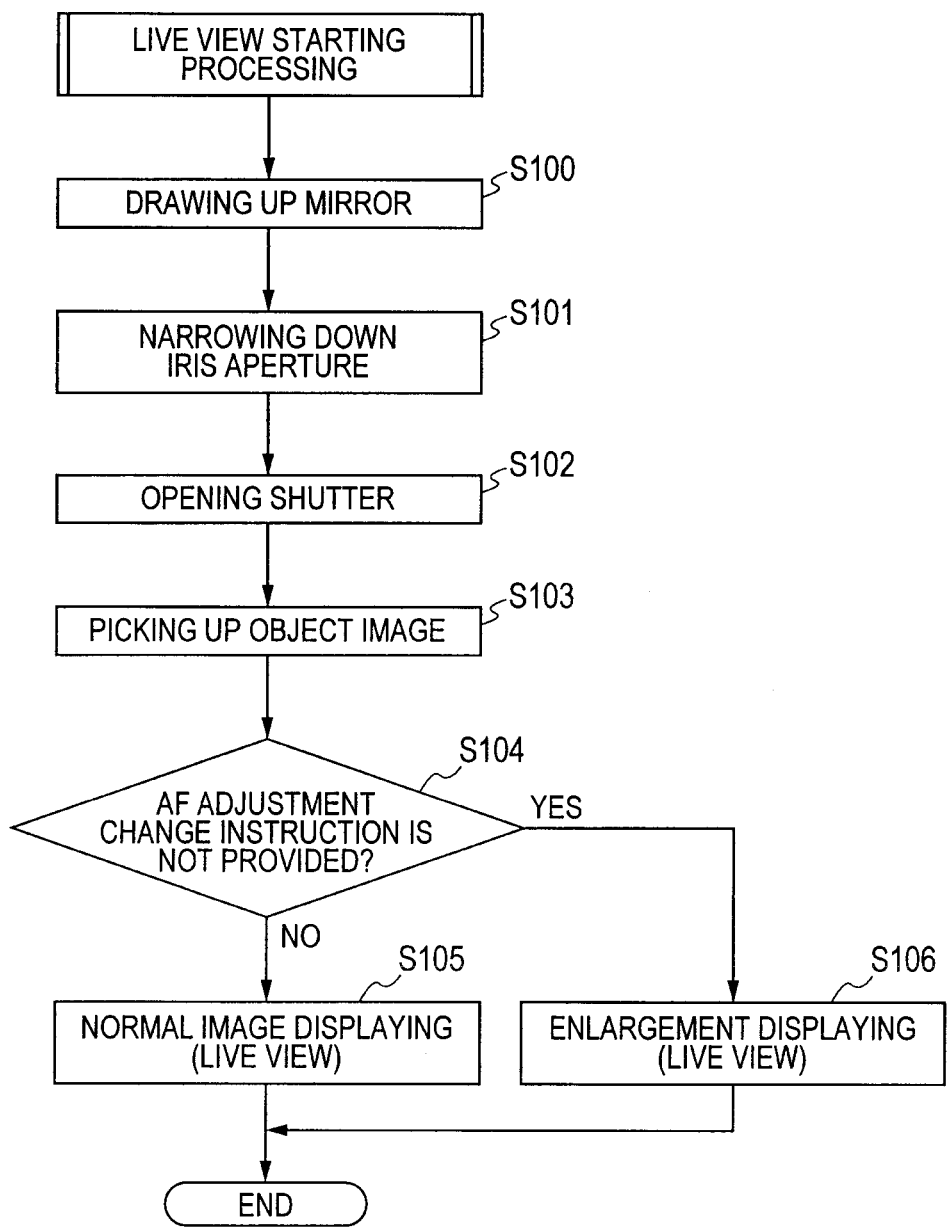
FIG. 5 is a flowchart illustrating a starting processing of a live view in the flowchart of FIG. 3.

Subsequently, the starting processing of the live view in step S19 will be described in detail with reference to FIG. 5. In step S100, the quick return mirror 12 is drawn up. In step S101, the Av value set in step S17 or S18 is transmitted from the microcomputer 39 to the internal lens system control unit 4 through the communicating terminals 6 and 10, thereby narrowing down the aperture of the iris 1 by the iris drive unit 2. In step S102, the focal plane shutter 17 is opened. In step S103, the drive timing of the image pickup element 20 is controlled by the timing control unit 32 on the basis of the Tv value set in step S17 or S18. A photographing signal is amplified by the amp unit 21 by a gain according to the ISO value set in step S17 or S18 and is converted into a digital signal by the AD conversion unit 22. The image data is stored into the buffer memory 26 by the image processing unit 23.

Figure 6A:
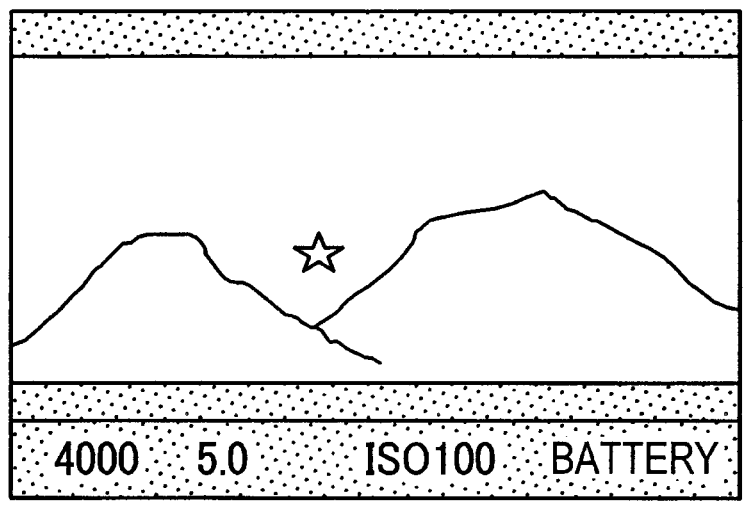
Figure 6B:
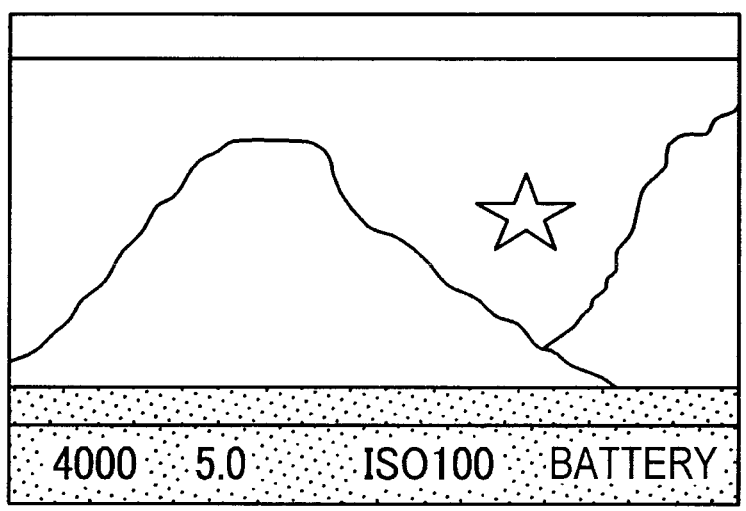

In step S104, if it is determined based on the information stored in step S13 that the AF adjustment change instruction is not provided, step S105 follows. If the AF adjustment change instruction is provided, step S106 follows. In step S105, the image data stored in the buffer memory 26 is converted into the analog signal by the memory controller 27 and is output to the liquid crystal display unit 25 by the liquid crystal drive unit 24. At this time, as illustrated in FIG. 6A, a normal live view display is performed. On the other hand, in step S106, the image data stored in the buffer memory 26 is subjected to an enlargement processing by the image processing unit 23, is converted into the analog signal through the memory controller 27, and is output to the liquid crystal display unit 25 by the liquid crystal drive unit 24. At this time, as illustrated in FIG. 6B, an enlarged live view display is performed.

Subsequently, a determination processing of whether or not the AF adjustment value used for the live view is changeable in step S11 will be described in detail. In step S200, information of the currently attached lens unit 100 is obtained through the communicating terminal 10. It is now assumed that the information which is obtained here includes at least an ID number peculiar to the lens and a name and the largest aperture value of the lens.

In step S201, whether or not the attached lens is usable for AF is discriminated from the ID number or name of the lens obtained in step S200. Thus, if the lens is usable for AF, step S202 follows. If the lens is unusable for AF, step S204 follows.

In step S202, whether or not the largest aperture value of the lens obtained in step S200 is brighter than a predetermined threshold value is discriminated. Thus, if it is brighter than the predetermined reference value (that is, if it is smaller than the predetermined threshold value), step S203 follows. If the largest aperture value is darker than the predetermined reference value (that is, if it is equal to or larger than the predetermined threshold value), step S204 follows.

Figure 8A:
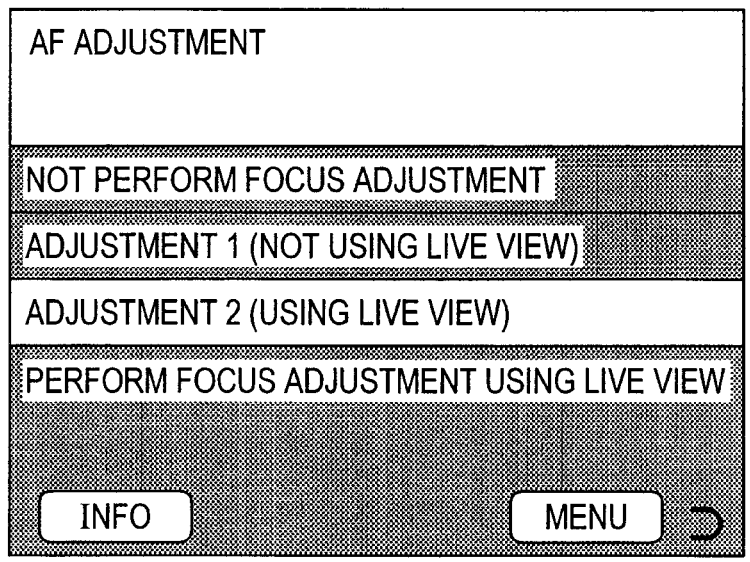

In step S203, it is assumed that the AF adjustment value used for the live view is changeable, and a GUI screen for promoting the user to select whether the change of the AF adjustment value used for the live view is performed or the change of the AF adjustment value which is not used for the live view is performed is displayed as illustrated in FIG. 8A. A state in which a selection portion of the AF adjustment value used for the live view is selected is illustrated in FIG. 8A. In step S12 in FIG. 3, the user selects the selection portion of the AF adjustment value used for the live view, so that the change instruction of the AF adjustment value used for the live view is output.

Figure 8B:
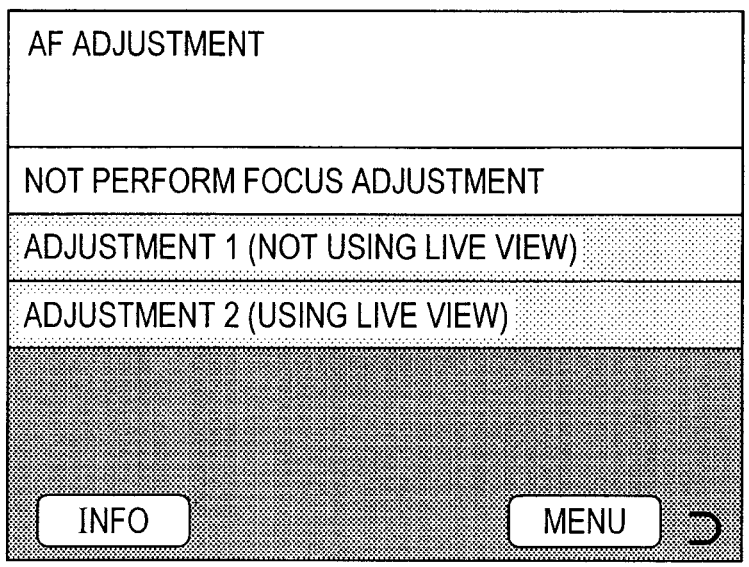

On the other hand, in step S204, it is assumed that the AF adjustment value is unchangeable, and a GUI screen is displayed in such a manner that a selection portion of the AF adjustment value is displayed with being grayed out as illustrated in FIG. 8B.

By controlling as mentioned above, the live view display at the time of changing the AF adjustment value is always properly performed irrespective of the setting by the user and an enlarged image can be displayed. Therefore, when the change of the AF adjustment value is performed, there is no need to reset the values set by the user himself. Such a troublesomeness that the user himself executes the enlarging operation in order to confirm a focusing state is eliminated. The user can easily perform the AF adjustment so that he can viewably understand it.

To a lens group without the auto focusing function or a lens group which is unusable for AF, the change of the AF adjustment value used for the live view can be prevented. Such a state where an unnecessary adjustment value is input can be prevented. Consumption of an electric power by the live view can be also reduced.

Although the exemplary embodiments of the invention have been described above, the invention is not limited to those embodiments but various modifications and changes are possible within the scope of the essence of the invention.

Other Embodiments

The invention is also realized by executing the following processings: that is, software (program) for realizing the functions of the embodiments mentioned above is supplied to a system or apparatus through a network or various kinds of storage media and a computer (or a CPU, an MPU, or the like) of the system or apparatus reads out the program, and executes processings based on the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-082165, filed Apr. 1, 2011, which is hereby incorporated by reference herein in its entirety.

What is claimed is:

1. An image pickup apparatus having a change mode in which an auto focusing adjustment value is changeable with a live view being displayed on a display unit, comprising:
   a display control unit configured to perform the live view for displaying an image of an object on the display unit;
   a photometry unit configured to measure brightness of the object;
   and a control unit configured to select a program diagram corresponding to a photographing mode selected by a user from a plurality of program diagrams each for deciding an electronic shutter speed, an aperture value, and an ISO (International Organization for Standardization) value,
   wherein in a case where the photographing mode is shifted to the change mode, the control unit allows the live view to be performed by a predetermined program diagram irrespective of the photographing mode selected by the user,
   and wherein when a largest aperture value of a lens is darker than a predetermined reference value, the control unit restricts the shift to the change mode.

2. An apparatus according to claim 1, wherein when the photographing mode is shifted to the change mode, the control unit allows an enlarged image to be displayed as a live view image.

3. An apparatus according to claim 1, wherein the control unit discriminates whether or not the photographing mode can be shifted to the change mode.

4. An apparatus according to claim 3, wherein when a lens which is unusable for an auto focusing is attached, the control unit restricts the shift to the change mode.

5. A control method of an image pickup apparatus having a change mode in which an auto focusing adjustment value is changeable with a live view for displaying an image of an object on a display unit, and a photometry unit configured to measure the brightness of the object, comprising the step of:
   displaying the live view for displaying an image of an object on the display unit;
   selecting a program diagram corresponding to a photographing mode selected by a user from a plurality of program diagrams each for deciding an electronic shutter speed, an aperture value, and an ISO (International Organization for Standardization) value,
   wherein in a case where the photographing mode is shifted to the change mode, the selecting step selects a predetermined program diagram irrespective of the photographing mode selected by the user, to perform the live view in the display step,
   and wherein when a largest aperture value of a lens is darker than a predetermined reference value, the shift to the change mode is restricted.

6. A non-transitory storage medium storing a program comprising a program code for causing a computer to execute a control method of an image pickup apparatus having a change mode in which an auto focusing adjustment value is changeable with a live view for displaying an image of an object on a display unit, and a photometry unit configured to measure the brightness of the object,
   the control method comprising the steps of:
   displaying the live view for displaying an image of an object on the display unit;
   selecting a program diagram corresponding to a photographing mode selected by a user from a plurality of program diagrams each for deciding an electronic shutter speed, an aperture value, and an ISO (International Organization for Standardization) value,
   wherein in a case where the photographing mode is shifted to the change mode, the selecting step selects a predetermined program diagram irrespective of the photographing mode selected by the user, to perform the live view in the display step, and wherein when a largest aperture value of a lens is darker than a predetermined reference value, the shift to the change mode is restricted.

7. An apparatus according to claim 1, wherein the plurality of program diagrams each decides the electronic shutter speed, the aperture value, and the ISO value correspondingly to the brightness of the object measured by the photometry unit.

8. An apparatus according to claim 1, wherein a gain value is according to the ISO value.

* * * * *